July 31, 1945.  W. S. WOLFRAM  2,380,681
FLUID COUPLING
Filed May 29, 1942  3 Sheets-Sheet 1

Inventor
William S. Wolfram
By Blackmore, Spencer & Flint
Attorneys

Patented July 31, 1945

2,380,681

UNITED STATES PATENT OFFICE 2,380,681

FLUID COUPLING

William S. Wolfram, Scotch Plains, N. J., assignor to General Motors Corporation, Detroit, Mich., a corporation of Delaware Application May 29, 1942, Serial No. 445,036

8 Claims. (Cl. 192—3.2)

This invention relates to clutches. It is intended primarily as an improved clutch for association with an engine flywheel although its utility is not limited to its use in that relation.

A primary object of the invention is to provide for drivably connecting a power unit with a driven unit whereby the driven unit may be connected and disconnected without stopping the power unit and whereby the clutch will operate smoothly and not cause jerking.

As a more specific object the invention seeks the accomplishment of its major objective by the use of a clutch employing a fluid medium of high specific gravity.

An important associated object is found in the provision for clutch release in the form of an inherent part of the fluid clutch thereby to avoid the need for an associated releasable friction clutch arranged in series with the fluid clutch.

Another object is the provision of means acting automatically to prevent a car equipped with the fluid clutch from rolling down grade.

The invention includes the provision of hydraulic means whereby the clutch may be released and yielding means to normally maintain the clutch parts in driving relation.

Other objects include structural arrangements which shall be effective yet simple and comparatively inexpensive.

Still other objects and advantages will appear from a reading of the description which follows.

Figure 1:
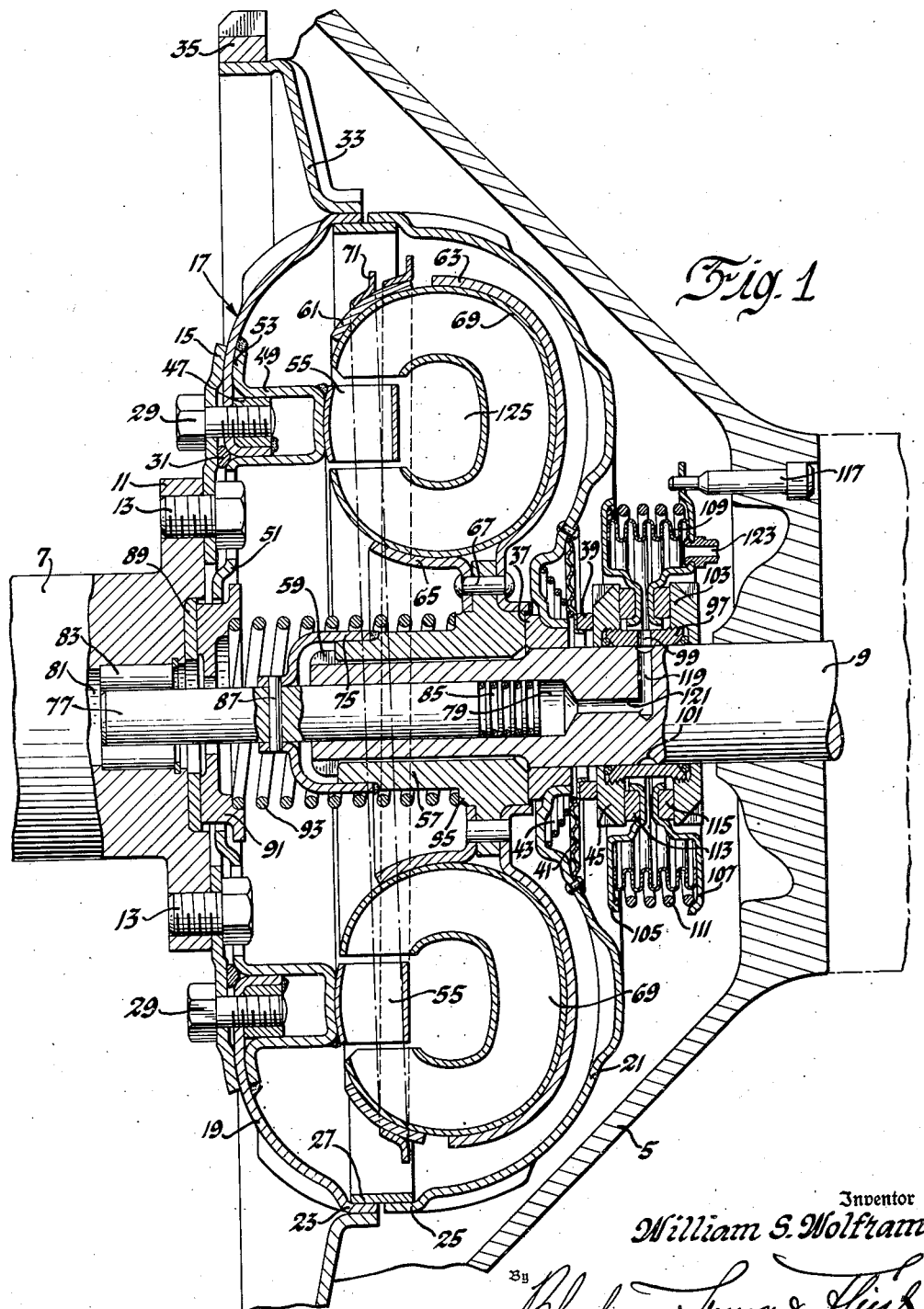
Fig. 1 is a transverse section through one embodiment of the invention.

Referring to the drawings in connection with this description, it will be seen that numeral 5 represents a more or less conventional housing for a clutch which is to connect an engine shaft 7 with a transmission shaft 9. Numeral 11 represents a flange on shaft 7 and to it is secured by cap screws 13 a steel stamping 15. The flywheel is designated as a whole by numeral 17. It is made from two halves 19 and 21 joined together at their edges 23 and 25. The two edges may be welded to an internally positioned band 27 to make an oil-tight joint. Part 19 of the flywheel is secured to stamping 15 by cap screws 29. To seal the joint between parts 19 and 15 there is seen a ring of lead 31. A ring 33 carries the usual ring gear 35, ring 33 being welded to ring gear 35 and to the flywheel member 19.

At 37 is shown a bronze bearing. It is pressed into the flanged central hole in flywheel member 21. Bearing 37 provides a close fit with shaft 9 but not such as to prevent relative rotation between the flywheel and the shaft. The bearing supports the flywheel and acts also as a retainer for oil. Additional sealing means is used to supplement such oil sealing as is afforded by bearing 37. The additional sealing means includes a ring 39 of bronze and a corrugated disc 41 of metal. The outer edge of disc 41 is fastened to flywheel member 21 and the inner edge is shaped to fit the forward and inner faces of ring 39. A conical spring 43 is arranged in abutment with part 21 and disc 41 to hold the disc in tight engagement with the ring 39 and the latter against a collar 45 of metal which is assembled on shaft 9 to prevent leakage.

On the inside of flywheel member 19 is an annular steel ring 47 secured by the attaching means 29. Ring 47 is positioned within the walls of a ring 49 which is channel shape in section and has inner and outer flanges 51 and 53 respectively. The ring 49 is fastened to the flywheel member 19 and the ring 47 by welding or otherwise. A plurality of channel-shaped pieces 55 are welded to ring 49.

Within the flywheel is a hub 57. It is to slide axially on the splines 59 of transmission shaft 9. To the hub 57 are secured rings 61, 63 and 65 of steel. Parts 63 and 65 are attached to hub 57 by rivets 67. A plurality of fins 69 preferably steel stampings of channel shape in section are fastened to the inside surface of the rings 61, 63 and 65. A spiral flange 71 surrounds and is secured to the outer surface of ring 61. It completely surrounds the ring and may be of one or more pieces.

Hub 57 slidable on the shaft splines 59 is limited in its rearward movement by engaging bearing 37. A collar 75 is attached to the front end of hub 57 as by welding. A pin 77 slides within an axial opening 79 of shaft 9. It also slides in a hole 81 in the crankshaft, where it is supported by roller bearings 83. The pin is sealed against leaks by rings 85. The collar 75 is secured to the pin 77 by a rivet 87. A bronze bearing washer 89 is press fitted into the rear end of the crankshaft. A spring seat 91 bears against washer 89 and receives one end of a coil spring 93, the other end of which is seated on a shoulder 95 of hub 57.

A collar 97 of steel is assembled on shaft 9. It is provided with a radial hole 99 which registers with an annular groove 101 formed on the shaft. Collar 97 is held in place by collars 45 and 103 which are tightly screwed to collar 97, there being clamping lead rings as shown to seal the joint. Between rings 45 and 103 are discs 105 and 107. A sylphon type of wall 109 is securely sealed by silver solder or otherwise to the discs 105 and 107. The discs 105 and 107 are held apart by a spring 111 to provide pressure to hold bearings 113, 115 secured thereto tightly against the collars 45 and 103. At 117 is a pin projecting from housing 5 and engaging disc 107 to prevent any tendency of the parts 105 and 107 to rotate. The shaft 9 has radial and axial passages 119 and 121 affording communication between groove 101 and the space 79. At 123 is a fitting for connection with a conduit for supplying fluid under pressure from any suitable fluid pump or master cylinder not shown.

The flywheel is to be partly filled, perhaps 80%, with a heavy oil of such viscosity as will be suitable for a wide temperature range.

When the flywheel is in action the oil is thrown outwardly and revolves with it and influenced by the rotating channel member 55, causes the driven member—the hub 57 and connected parts to rotate and thus produce a rotation of the transmission shaft. In further explanation of the operation it will be seen that spring 93 is holding the driven rotor elements in such a position that the channel members are operable to influence the rotation of the shaft 9. If, however, fluid under pressure is delivered through opening 123 and the passages therefrom to space 79 the pin 77 will be moved toward the flywheel and with it the driven unit until the members 55 are located within the hollow core 125. It thus becomes inoperative and the driven elements are no longer driven. When the fluid pressure on pin 77 is released the spring 93 returns the parts to the operative position. In so returning the parts the fluid within the flywheel acting on the spiral fins 71 offers its assistance.

When the clutch is released the fluid pressure within and between the discs 105 and 107 presses the non-rotating parts 113 and 115 against the parts 45 and 103 rotating with shaft 9 and the friction tends to overcome the inertia of the driven shaft and bring it to rest.

For use in the hydraulic clutch I prefer to use an oil with colloidal lead in suspension whereby the specific gravity is increased and to afford lubrication.

Figure 2:
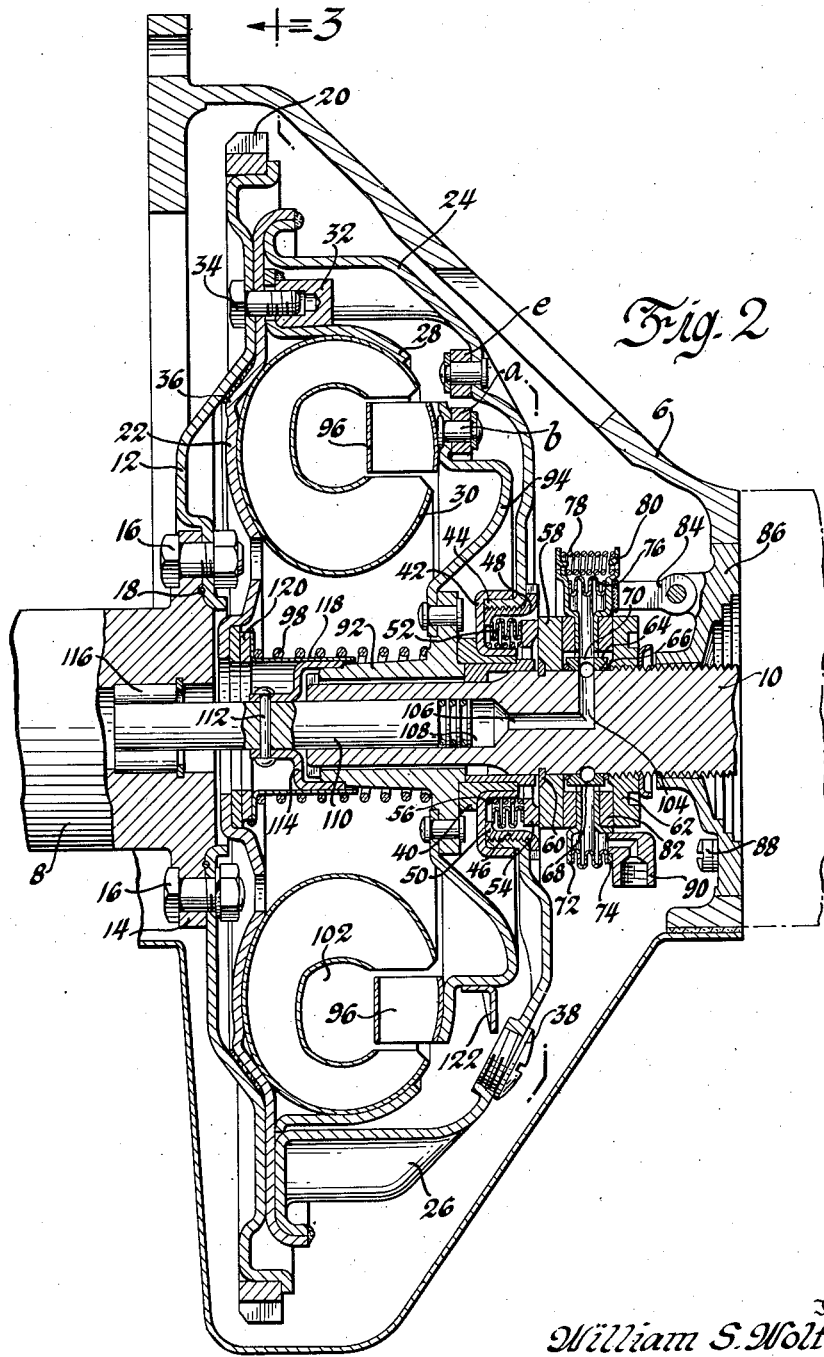
Fig. 2 is a similar view of a modified form.
Figure 3:
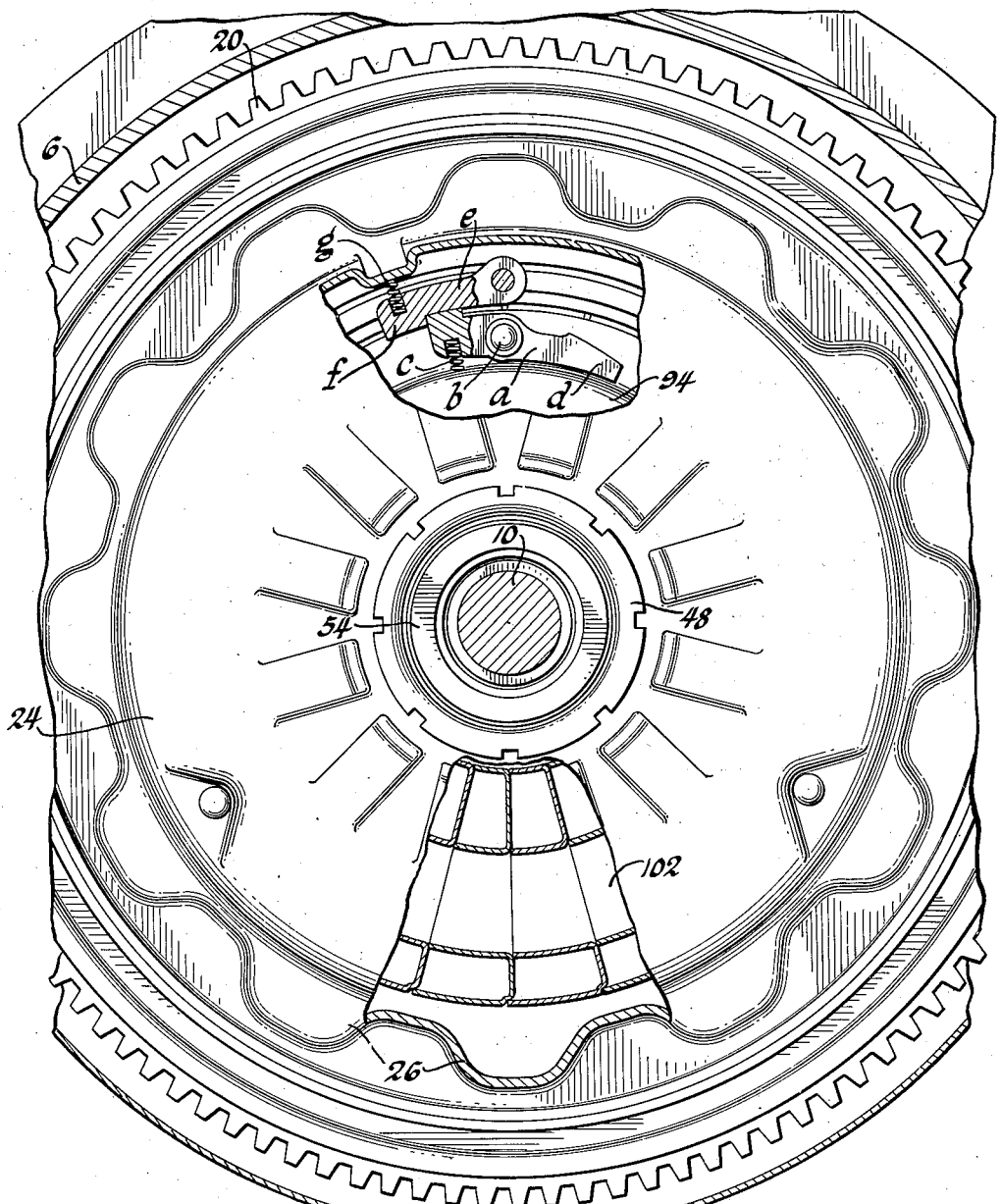
Fig. 3 is a view in elevation partly broken away and in section the plane of the view being indicated on Fig. 2 by line 3—3.

A second embodiment of the invention is shown in Fig. 2. In this form the housing 6 contains the fluid clutch for coupling the engine shaft 8 with the transmission shaft 10. A plate 12 is secured to the flywheel flange 14 by fastening means 16, there being used a sealing gasket 18. The plate 12 carries the usual ring gear 20. The flywheel proper includes a plate 22 and a bowl-like casing 24 fastened together by welding their edges to make a leak-proof joint. The wall of casing 24 may be corrugated or fluted as at 26 to add rigidity and to constitute a means to circulate air outside the flywheel and within the housing 6 for cooling. On the inside of casing 24 and secured to plate 22 is a ring 28 to which are assembled and fastened by welding a plurality of fins 30 which are of channel shape in section. A plurality of lugs 32 are welded to ring 28. The flywheel proper is fastened to plate 12 by bolts 34 which are screwed into lugs 32 the joint being sealed by a gasket 36. The casing 24 is provided with a filler hole closed by a cap 38.

At the point where the shaft 10 passes through the casing 24 is a bronze bushing 40. It rotates relative to the shaft and is fixed to the casing. It is tightly pressed on a collar 42 which may be a steel stamping and which latter is welded to the outside surface of a cylindrically shaped flange 44 which extends inwardly from casing 24. The inside surface of flange 44 is threaded to secure a collar 46. The outer edge of collar 46 is provided with an outwardly extending radial flange 48 which is formed with notches to receive a spanner wrench. At the opposite edge is an inwardly directed flange 50 to which is fastened by silver solder a sylphon sleeve 52. To the opposite end of the sleeve 52 is soldered a bearing ring 54. Associated with the sylphon collar is coil spring 56 which bears against collar 42 and ring 54 to hold the ring 54 tightly against a flange or collar 58 which is secured to shaft 10. A snap ring 60 in a groove of the shaft serves to hold the collar 58. A collar 62 with internal threads is also secured to the shaft 10 somewhat to the rear of collar 58. Between these collars and closely fitting the transmission shaft 10 is a spacing collar 64. It is tightly clamped between collars 58 and 62 there being sealing gaskets 66. Collar 64 has an annular groove 68 connecting by a hole 70 with the outer surface. Also between collars 58 and 62 is a bellows unit to form a closure communicating with external hydraulic operating means and the internal passages for clutch release. The unit includes steel plates 72 and 74. These plates are circular in outline. They have central openings to surround the collar 64. The plates are connected by sylphon bellows 76 soldered to each plate. A plurality of coil springs 78 between the plates 72 and 74 and held by lugs 80 struck from the plates serve to hold bearing rings 82 soldered to each plate tightly against collars 58 and 62. The bellows unit also acts as a brake when the clutch is released because of the pressure between rings 82 and collars 58 and 62. There are a plurality of lugs 84 welded to plate 74. These lugs are fastened to matching lugs on cap 86 which is fastened to the transmission housing by screws 88. The unit is thus held in fixed position. It is provided with a threaded socket 90 to which the conduit of a hydraulic system may be connected.

Within the flywheel is the driven rotor corresponding to the driven plate assembly of a conventional friction clutch. Hub 92 slides on splines of shaft 10. Hub 92 has a reduced end which enters freely within the end of bearing 40. By this arrangement the transmission shaft 10 may be withdrawn from the flywheel as may be necessary for service without disturbing the fluid flywheel. A ring 94 is fastened to the hub. To ring 94 are welded a plurality of fins 96 which fit with sufficient clearance into an annular recess in the assembly of fins 30. The rotor is shown in the figure in the clutch engaged position. It is so held by a spring 98 engaging hub 92 and a suitable abutment. To release the clutch the rotor is moved forwardly so that the fins 96 enter the core 102 of the assembly of fins 30 whereby drive is interrupted as in the embodiment first described. This action is effected by fluid under pressure from a suitable source being forced through opening 90 and passing into the space between plates 72 and 74, through passages 104 and 106 in the driven shaft and into a cylindrical chamber 108 within which slides a pin or piston 110 connected as before by a rivet 112 to a yoke 114 connected to the hub. The end of the piston slides within bearings 116 in the engine shaft 8. The spring 98 may be provided with a flanged sleeve 118 to guide and seat the spring, its flange being welded to a bearing washer 120.

The same operating fluid, an oil of low viscosity and high specific gravity, fills about 80% of the capacity of the flywheel. It may contain a suitable amount of dispersed metal held in suspension.

When the engine is running centrifugal force acts on the fluid in the flywheel and causes it to circulate within the C-shaped fins 30. When the rotor is in driving position it is forced to rotate. When the fins 96 are projected into the core 102, the drive is discontinued. At that time the fluid within the sealing bellows 76 causes parts 82 to frictionally engage the parts 58 and 62 to check the rotation of the shaft 10 due to the inertia of the parts connected thereto.

A spaced fin 122 carried by plate 94 is acted upon by the fluid in the flywheel and aids the spring 98 in effecting reengagement of the clutch after release. As explained above in service the projecting ends of hub 92 and bearing 40 provide for the removal of shaft 10 without disturbing the fluid clutch.

It may be desirable to provide means to hold the car parked on an inclined surface by means of the engine acting as a brake. To that end a plurality of pawls $a$ are pivoted to the rotor, each on a pivot $b$. A spring $c$ acts on each pawl to push it outwardly to locking position. The other end of the pawl is weighted as at $d$. The spring is so designed as to overcome the centrifugal force acting on the weighted end only when the rotor speed is 40 r. p. m. or less. A similar set of pawls $e$ is carried by the flywheel member 24. They, too, have weights $f$ and a spring $g$. The interengagement requires the rotation of the flywheel jointly with the rotor. Since the flywheel is connected to the engine, the engine serves as a brake to prevent rotation of the rotor and the forward movement of the car downgrade.

I claim:

1. In combination, a driving member, a driven member, a hollow flywheel carried by the driving member, said driven member projecting into said hollow flywheel, a fluid clutch to couple said flywheel and driven member and including first and second parts non-rotatably connected to the flywheel and driven member, said first part having fins and an inner core, spring means to move said parts into operative relation and other means operable to effect relative movement of said parts whereby the fins of the second part enter said core, one of said parts having a hub reciprocable on said driven member and said spring means surrounding and engaging said hub, together with a pawl on the flywheel and a cooperating pawl on that part of the coupling associated with the driven member whereby power means for driving the driving member may act as a brake to check rotation of the driven member.

2. In combination, a driving member, a driven member, a hollow flywheel carried by the driving member, said driven member projecting into said hollow flywheel, a fluid clutch to couple said flywheel and driven member and including first and second parts non-rotatably connected to the flywheel and driven member, said first part having fins and an inner core, spring means to move said parts into operative relation and other means operable to effect relative movement of said parts whereby the fins of the second part enter said core, one of said parts having a hub reciprocable on said driven member and said spring means surrounding and engaging said hub, together with a pawl on the flywheel and a cooperating pawl on that part of the coupling associated with the driven member whereby power means for driving the driving member may act as a brake to check rotation of the driven member, said pawls being weighted to effect disengagement under the action of centrifugal force thereon and springs operable on said pawls to effect engagement of said pawls at low speeds of rotation.

3. In combination, a driving member, a driven member, a releasable fluid clutch to couple said members, said clutch comprising a first part having a set of C-shaped fin formations forming interrupted channels and an inner core, a second part having a set of fin formations, means to connect said two formations one to the driving member, the other to the driven member, spring means to effect relative movement of said two parts into registration for driving and other means to effect an opposite relative movement whereby said second set occupies the core of the first set, said other means including a reciprocable fluid operated piston in said driven member, connections therefrom to one of said parts and conduit means to supply fluid pressure to said piston, said conduit means including movable walls forming a closed space and friction members carried by said walls to engage cooperating rings carried by and rotatable with said driven member.

4. In combination, a driving member, a hollow flywheel secured thereto, a driven shaft projecting into said flywheel, fluid coupling means connecting said flywheel and driven shaft and including a hub reciprocable on said driven shaft, a bearing carried by said flywheel and closely embracing said driven shaft, said reciprocable hub and bearing having overlapping regions whereby said shaft may be removed without disturbing said fluid coupling.

5. In combination, a driving member, a driven member, a fluid clutch to couple said members, hydraulic means to release said clutch and friction means operable in response to the actuation of said hydraulic means to retard rotation of said driven member when releasing the clutch said hydraulic means including an expansible chamber having a movable wall, said friction means including a part rotatable with said driven member and a non-rotatable part movable in response to the expansion of said chamber to frictionally engage said rotatable part.

6. In combination, a driving member, a driven member, a hollow flywheel carried by the driving member, said driven member including a shaft projecting into said flywheel, a fluid clutch within said flywheel for coupling said flywheel to said shaft, said fluid clutch including a turbine element and a rotor element one of said elements being slidable on said shaft, yielding means to effect relative movement of said elements to operative position, hydraulic means to overcome said yielding means and effect relative movement of said elements to inoperative position, said hydraulic means including an expansible chamber with a movable wall, and friction means including a first part rotatable with the driven member and a second part movable in response to the expansion of said chamber into frictional engagement with said first part to retard the rotation of the driven member.

7. The invention defined by claim 6, said hydraulic means including a piston slidable in an axial bore of said shaft, means connecting said piston to said slidable element and passages in said shaft for supplying hydraulic pressure from an external source to said axial bore.

8. In combination, a driving member, a driven member, a hollow flywheel carried by the driving member, said driven member including a shaft projecting into said flywheel, a fluid clutch within said flywheel for coupling said flywheel to said shaft, said fluid clutch including a turbine element and a rotor element one of said elements being slidable on said shaft, yielding means to effect relative movement of said elements to operative position, hydraulic means to overcome said yielding means and effect relative movement of said elements to inoperative position, said hydraulic means including a piston slidable in an axial bore of said shaft, means connecting said piston to said slidable element and passages in said shaft for supplying hydraulic pressure from an external source to said axial bore, said hydraulic means also including a non-rotatable annular sealed space having movable walls surrounding said shaft and friction means carried by the walls of said space and said shaft to retard rotation of said shaft under the influence of hydraulic pressure.

WILLIAM S. WOLFRAM.